United States Patent
Rumbaugh et al.

(10) Patent No.: US 9,941,770 B2
(45) Date of Patent: Apr. 10, 2018

(54) RADIAL BEARING THRUST WASHER ARRANGEMENT FOR SUBMERSIBLE PUMP MOTOR

(71) Applicant: Baker Hughes Incorporated, Houston, TX (US)

(72) Inventors: Michael R. Rumbaugh, Claremore, OK (US); James Christopher Clingman, Broken Arrow, OK (US)

(73) Assignee: Baker Hughes, a GE Company, LLC, Houston, TX (US)

(*) Notice: Subject to any disclaimer, the term of this patent is extended or adjusted under 35 U.S.C. 154(b) by 660 days.

(21) Appl. No.: 14/581,095

(22) Filed: Dec. 23, 2014

(65) Prior Publication Data
US 2015/0188384 A1 Jul. 2, 2015

Related U.S. Application Data

(60) Provisional application No. 61/921,212, filed on Dec. 27, 2013.

(51) Int. Cl.
| | |
|---|---|
| H02K 7/08 | (2006.01) |
| H02K 5/167 | (2006.01) |
| H02K 5/132 | (2006.01) |

(52) U.S. Cl.
CPC .............. *H02K 7/08* (2013.01); *H02K 5/167* (2013.01); *H02K 5/132* (2013.01)

(58) Field of Classification Search
CPC ........... H02K 7/08; H02K 5/167; H02K 5/132
See application file for complete search history.

(56) References Cited

U.S. PATENT DOCUMENTS

| | | |
|---|---|---|
| 3,573,510 A | 4/1971 | Otto |
| 3,786,289 A | 1/1974 | Baclawski et al. |
| 4,513,215 A * | 4/1985 | Del Serra ............ H02K 5/167 |
| | | 29/598 |
| 5,189,328 A | 2/1993 | Knox |
| 6,099,271 A | 8/2000 | Brookbank |
| 6,232,687 B1 | 5/2001 | Hollenbeck et al. |
| 6,300,699 B1 | 10/2001 | Parmeter |
| 6,566,774 B2 | 5/2003 | Parmeter et al. |
| 6,802,648 B2 | 10/2004 | Merot et al. |
| 6,956,310 B1 * | 10/2005 | Knox .................... H02K 5/132 |
| | | 310/87 |
| 7,780,424 B2 | 8/2010 | Parmeter et al. |
| 7,808,140 B2 | 10/2010 | Cain et al. |
| 7,950,906 B2 | 5/2011 | Hall, Jr. et al. |

(Continued)

*Primary Examiner* — Naishadh Desai
(74) *Attorney, Agent, or Firm* — Bracewell LLP; James E. Bradley

(57) ABSTRACT

An electrical submersible pump assembly has a motor that drives the pump. The motor has a stator having a bore, a shaft extending through the stator, and rotor sections mounted to the shaft, each of the rotor sections having first and second end rings. A non rotating bearing body has a periphery retained in non rotating engagement with the bore of the stator. The bearing body has a first end axially spaced from the first end ring, defining a first gap, and a second end axially spaced from the second rotor ring, defining a second gap. A first thrust washer is located in the first gap. Each thrust washer has a metal or carbide thrust surface for contact with the bearing body and an elastomeric thrust surface for contact with one of the end rings.

20 Claims, 2 Drawing Sheets

(56) References Cited

U.S. PATENT DOCUMENTS

| | | |
|---|---|---|
| 8,342,821 B2 | 1/2013 | Prieto |
| 8,567,042 B2 | 10/2013 | Neuroth et al. |
| 2011/0037332 A1* | 2/2011 | Neuroth .................. F16C 17/04 310/87 |
| 2014/0127052 A1 | 5/2014 | Knapp |

* cited by examiner

RADIAL BEARING THRUST WASHER ARRANGEMENT FOR SUBMERSIBLE PUMP MOTOR

CROSS REFERENCE TO RELATED APPLICATION

This application claims priority to provisional application 61/921,212, filed Dec. 27, 2013.

FIELD OF THE DISCLOSURE

This disclosure relates in general to submersible well pump motors and in particular to a metal and elastomer thrust washer arrangement for radial bearings of the motor.

BACKGROUND

Electrical submersible pump (ESP) motors can be very long and small in diameter. To obtain sufficient horsepower, multiple rotor sections are mounted on the same shaft inside the stator with support bearings between each rotor section and on each end of the rotor stack. These bearings consist of a journal bearings with a sleeve mounted on and rotating with the shaft and a corresponding carrier bearing placed over the sleeve and in frictional engagement with the inside diameter of the stator. A thrust washer is usually placed on opposite ends of the rotor carrier bearing between the carrier bearing and the adjacent rotor sections.

The rotor stack is supported at its lower end by a retainer on the shaft. A thrust bearing supports the shaft at the top end of the motor. When the motor heats up, the rotor shaft elongates in a downward direction due to thermal expansion, while the rotor sections simultaneously thermally expand upward along the shaft. The amount of relative motion depends on the properties of materials involved, the rotors being dominated by copper and the shaft by steel.

The thermal growth can result in relative movement of the carrier bearings with respect to the stator. Under certain temperature profiles, the rotor carrier bearings are forced to move axially with respect to the motor stator housing. This movement may occur when the motor experiences large temperature changes when energized, such as in cool subsea or cool well applications, or when the motor is placed in very hot conditions, such as in steam heated viscous oil well applications. This axial movement of the carrier bearings relative to the stator results when axial forces from the spinning rotor sections press against the thrust washers, which in turn press against one end of the carrier bearings, forcing them to move axially relative to the stator to accommodate the thermal expansion discussed above.

Great care must be taken to ensure the carrier bearings can move with sufficient ease as to not impose excessive forces on the thrust washers and at the same time not be so loose a fit in the stator as to cause the carrier bearings to spin within the stator or cock and jamb when being moved. These two conflicting requirements require very precise fitting of the carrier bearings to the inside of the stator and even a change of less than 0.001" can be the difference between a successful design and motor failure.

SUMMARY

The electrical submersible pump assembly disclosed herein includes a motor operatively coupled to a pump for driving the pump. The motor has a stator having a bore. A shaft extends through the bore along an axis of the motor. First and second rotor sections are mounted to the shaft for rotation therewith. A radial bearing is located between the first and second rotor sections and comprises a non rotating bearing body having a central opening through which the shaft extends. A periphery of the bearing body is in non rotating engagement with the bore of the stator. The bearing body has a first end axially spaced from the first rotor section, defining a first gap, and a second end axially spaced from the second rotor section, defining a second gap. A first thrust washer arrangement is located in the first gap for transferring thrust between the first rotor section and the first end of the bearing body when the first gap narrows due to thermal growth. A second thrust washer arrangement is located in the second gap for transferring thrust between the second rotor section and the second end of the bearing body when the second gap narrows due to thermal contraction. Each of the first and second thrust washer arrangements has a bearing body surface that engages one of the ends of the bearing body and a rotor section surface that engages one of the rotor sections while transferring thrust. The bearing body surface of each of the first and second thrust washer arrangements is harder than the rotor section surface.

Preferably the bearing body surface of each of the first and second thrust washer arrangements comprises a metal or a carbide. Preferably, the rotor section surface of each of the first and second thrust washer arrangements comprises an elastomer.

A sum of an axial thickness of the first thrust washer arrangement plus an axial thickness of the second thrust washer arrangement is less than a sum of axial dimensions of the first and second gaps.

A thrust surface area of each of the rotor sections is greater than a thrust surface area of the rotor section surface of each of the thrust washer arrangements. A thrust surface area of each of the first and second ends of the bearing body is less than a thrust surface area of the bearing body surface of each of the thrust washer arrangements. In the embodiment shown, a thrust surface area of the rotor section surface of each of the thrust washer arrangements is the same as a thrust surface area of the bearing body surface of each of the thrust washer arrangements.

A sleeve extends from the first to the second rotor section, fixing an axial distance between the first and second rotor sections. An axial length of the sleeve is greater than an axial distance between the first and second ends of the bearing body plus the first and second gaps.

The bearing body may have a plurality of lubricant flow passages extending axially therethrough. The lubricant flow passages are spaced around the axis in an array at a selected radius from the axis. An outer periphery of each of the thrust washers is located a distance from the axis no greater than the radius of the array of lubricant flow passages.

BRIEF DESCRIPTION OF THE DRAWINGS

So that the manner in which the features, advantages and objects of the disclosure, as well as others which will become apparent, are attained and can be understood in more detail, more particular description of the disclosure briefly summarized above may be had by reference to the embodiment thereof which is illustrated in the appended drawings, which drawings form a part of this specification. It is to be noted, however, that the drawings illustrate only a preferred embodiment of the disclosure and is therefore not to be considered limiting of its scope as the disclosure may admit to other equally effective embodiments.

DETAILED DESCRIPTION OF THE DISCLOSURE

Figures 1, 3:
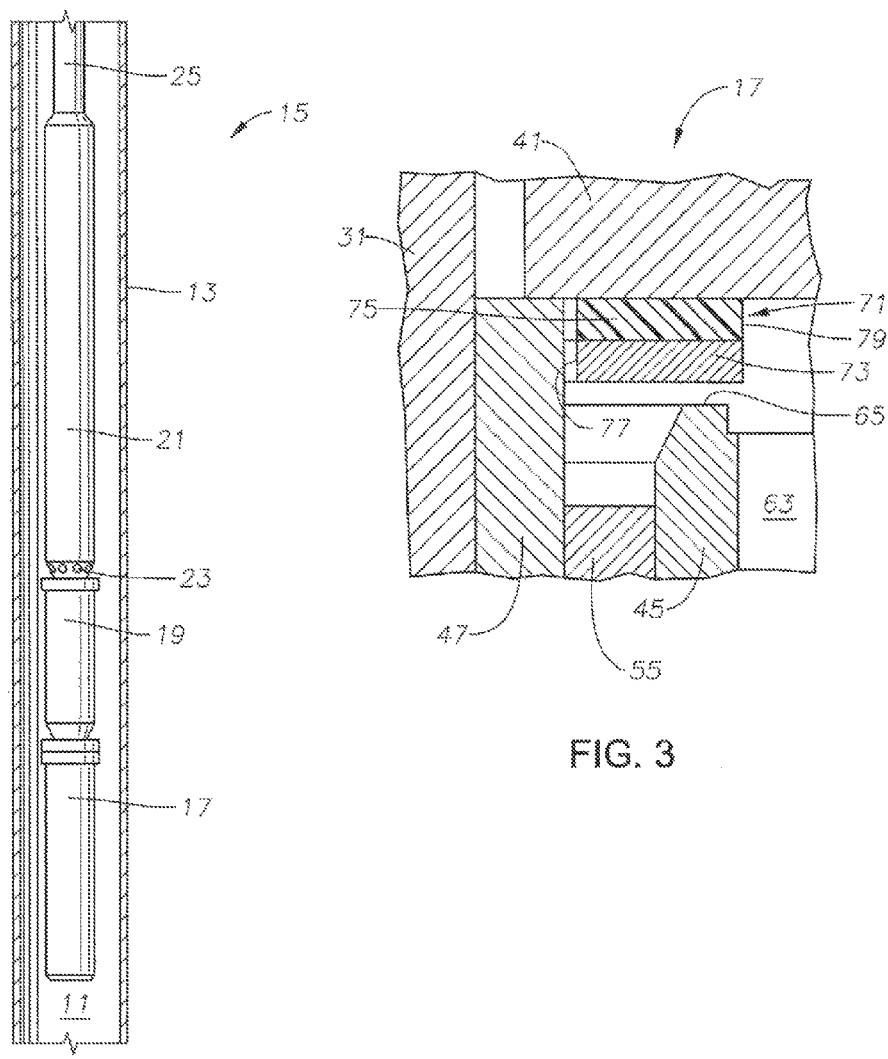
FIG. 1 is a side view of an electrical submersible pump assembly in accordance with this disclosure and installed in a well.
FIG. 3 is an enlarged view of a portion of the radial bearing of FIG. 2.

The methods and systems of the present disclosure will now be described more fully hereinafter with reference to the accompanying drawings in which embodiments are shown. The methods and systems of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Referring to FIG. 1, a well 11 has casing 13 that is perforated or has other openings to admit well fluid. A pump assembly 15 is suspended in well 11 to pump well fluid from well 11. Although shown installed vertically, pump assembly 15 could be located within an inclined or horizontal section of well 11 or it could be mounted exterior of well 11 for boosting the pressure of well fluid flowing from the well.

Pump assembly 15 includes a motor 17, normally a three-phase electrical motor. A seal section or pressure equalizer 19 connects to motor 17 if pump assembly 15 is submersed. Seal section 19 has components, such as a bladder or bellows, for reducing a pressure differential between dielectric lubricant contained in motor 17 and the hydrostatic pressure of the well fluid in well 11. Although shown above motor 17, seal section 19 could be mounted to a lower end of motor 17.

A pump 21 connects to the opposite end of seal section 19. Pump 21 may be a centrifugal pump with numerous stages, each stage having an impeller and a diffuser. Alternately, pump 21 may be a progressing cavity pump, having a helical rotor that rotates within an elastomeric stator. Pump 21 could also be a reciprocating type. Pump 21 has an intake 23 for drawing in well fluid. A gas separator (not shown) may be mounted between motor 17 and pump 21, and if so, intake 23 would be located in the gas separator. A string of production tubing 25 suspends pump assembly 15 in casing 13 in most installations.

Figure 2:
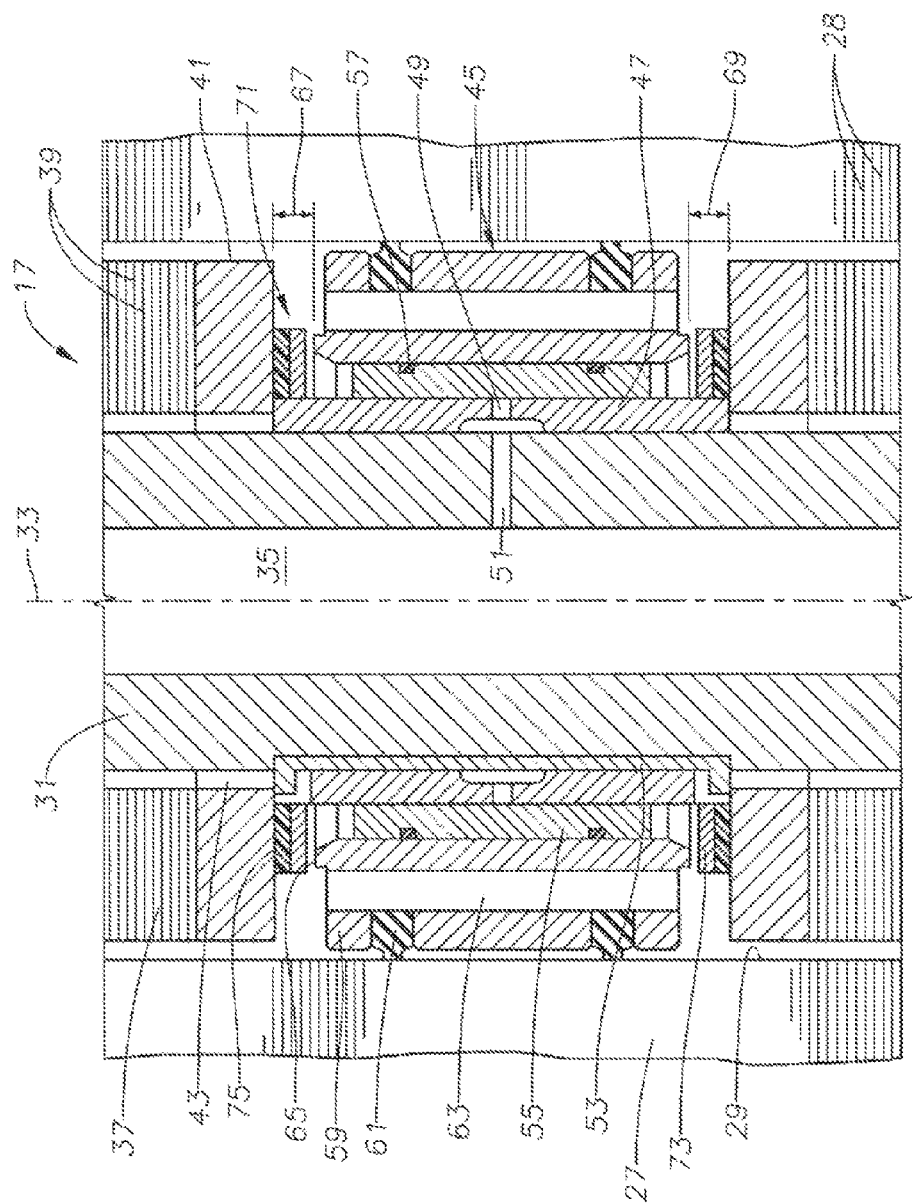
FIG. 2 comprises a sectional view of a portion of the motor of the pump assembly of FIG. 1, illustrating one of the radial bearings.

Referring to FIG. 2, motor 17 has a stator 27 that is non-rotatably mounted in a motor housing (not shown in FIG. 2). Stator 27 may be conventional and is made up of a plurality of laminations 28, which are thin steel disks having slots through which windings (not shown) are inserted. Stator 27 has an inner diameter or bore 29.

A shaft 31 extends through stator bore 29 along a longitudinal axis 33. Shaft 31 may have an axial passage 35. Several rotor sections 37 are mounted to shaft 31 for rotation therewith, and portions of two of the rotor sections 37 are shown. Each rotor section 37 may be conventional and is made up of laminations 39, which are also steel disks. Copper rods (not shown) extend axially through rotor laminations 39 and are spaced around axis 33. Rotor laminations 39 and the ends of the copper rods are secured together by a copper end ring 41 at each end of each rotor section 37. An axially extending keyway 43 extends along the inner diameter of each rotor section 37 and on shaft 31 for receiving a key (not shown) to cause rotor sections 37 to rotate with shaft 31. Rotor sections 37 may be free to move small increments axially relative to shaft 31 in response to thermal growth. As an example only, each rotor section 37 may be about a foot or so in length, and motor 17 may be up to 30 feet in length or more.

A radial bearing 45 locates between each of the rotor sections 37 to radially stabilize shaft 31 during rotation. Radial bearing 45 may have various configurations, and the one shown in FIG. 2 includes a bearing sleeve 47 mounted to shaft 31 for rotation in unison. Bearing sleeve 47 is free to slide axially on shaft 31 a small increment. In this example, bearing sleeve 47 has one or more transverse lubricant ports 49 extending from its inner diameter to its outer diameter. Lubricant port 49 is in fluid communication with a shaft lubricant port 51. Lubricant flowing through shaft axial passage 35 flows through shaft and sleeve lubricant ports 49, 51 for lubricating radial bearing 45. A key 53 has radially outward extending fingers 54 at its ends that engage notches or apertures in bearing sleeve 47 to cause bearing sleeve 47 to rotate with shaft 31.

The upper end of bearing sleeve 47 abuts end ring 41 of the next upward rotor section 37, and the lower end of bearing sleeve 47 abuts end ring 41 of the next lower rotor section 37. The terms "upper", "lower" and the like are used only for convenience since motor 17 could be oriented horizontally during operation. Bearing sleeve 47 thus fixes the axial distance between end rings 41 of adjacent rotor sections 37.

In the example of FIG. 2, an optional non rotating cylindrical sleeve insert 55 surrounds and closely receives bearing sleeve 47. Sleeve insert 55 has anti-rotation rings 57, which may be coiled springs or elastomeric rings, on its outer diameter. Ports (not shown) may extend from the inner to the outer diameters of sleeve insert 55 to allow radially outward lubricant flow. An annular bearing bushing or body 59 has a central bore that closely receives sleeve insert 55 and is engaged by anti-rotation rings 57. Sleeve insert 55 could be omitted, in which case, the bore of bearing body 59 would be in close, sliding engagement with the exterior of bearing sleeve 47.

Bearing body 59 has an outer diameter slightly smaller than stator bore 29. One or more anti-rotation rings 61 are mounted in grooves on the outer diameter of bearing body 59. Anti-rotation rings 61 may be coiled springs, elastomeric rings, as shown, or other devices to prevent rotation of bearing body 59 relative to stator 27. Axial lubricant flow passages 63 are spaced in an array around bearing body 59 parallel with axis 33. Flow passages 63 extend between opposite ends of bearing body 59. Bearing body 59 has an annular thrust shoulder or surface 65 on each end. Each thrust surface 65 is located radially inward from an inner diameter of the array of axial passages 63. Each thrust surface 65 protrudes a short distance from its respective end in this example. Each thrust surface 65 may be a flat, annular surface in a plane perpendicular to axis 33. Alternately, each thrust surface 65 may have scalloped cuts (not shown) to facilitate lubricant flow across each thrust surface 65.

The axial distance from the thrust surface 65 on the lower end to the thrust surface 65 on the upper end is less than the axial dimension of bearing sleeve 47. The lesser axial height of bearing body 59 than bearing sleeve 47 results in an axial upper gap 67 between the thrust surface 65 on the upper end of bearing body 59 and the end ring 41 of the next upward rotor section 37. Similarly, an axial lower gap 69 is located between the thrust surface 65 on the lower end of bearing body 59 and the end ring 41 of the next lower rotor section 37. Axial gaps 67, 69 vary during operation of motor 17 and often are not the same. The sum of axial gaps 67, 69 does not change, however; when axial gap 67 increases, axial gap 69 decreases by the same amount and vice versa.

A thrust transmitting device or arrangement 71 locates in each gap 67, 69. As shown also in FIG. 3, each thrust transmitting device 71 has a metal portion 73 that faces one of the bearing body thrust surfaces 65. Each thrust transmitting device 71 has an elastomeric portion 75 facing one of the end rings 41. Metal portion 73 is formed of a wear resistant, non-magnetic metal, such as stainless steel or Stellite, a cobalt chromium alloy. Metal portion 73 could also be formed of a carbide, such as tungsten carbide. Elastomeric portion 75 is also non-magnetic and is formed of a polymer or plastic, such as a fluoropolymer. Examples of the material include polyether ether ketone (PEEK), polytetra fluorothylene (PTFE), or Rulon, which is a type of PTFE. Metal portion 73 is harder and more wear resistant than elastomeric portion 75.

Thrust transmitting device 71 may be free to float both rotationally and axially. That is, it can move axially between abutment with end ring 41 and abutment with bearing body thrust surface 65. Also, thrust transmitting device 71 can either rotate or not rotate. The engagement between the rotating end ring 41 and thrust transmitting device 71 can be dynamic or static. The engagement between the non rotating bearing body thrust surface 65 and thrust transmitting device 71 may be dynamic or static. While transferring thrust between end ring 41 and bearing body thrust surface 65, thrust transmitting device 71 will engage both end ring 41 and bearing body thrust surface 65, and it can be either rotating or not rotating.

Alternately, thrust transmitting device 71 can be bonded to end ring 41 by an adhesive, in which case thrust transmitting device 71 would always rotate. As another alternate embodiment, thrust transmitting device 71 can be bonded to bearing body thrust surface 65 by an adhesive, in which case thrust transmitting device 71 would not rotate.

Metal portion 73 of thrust transmitting device 71 may be a separate thin, annular washer from elastomeric portion 75. Metal portion 73 may be free of bonding to elastomeric portion 75. Alternately, metal portion 73 may be bonded to elastomeric portion 75 by an adhesive. Further, elastomeric portion 75 may be a coating or layer applied to metal portion 73.

Metal portion 73 and elastomeric portion 75 may have the same inner diameter 77 and outer diameter 79. Preferably, inner diameter 77 of thrust transmitting device 71 is slightly larger than the outer diameter of bearing sleeve 47, so that there is no contact. The outer diameter 79 of thrust transmitting device 71 is approximately the same as the outer diameter of bearing body thrust surface 65, which is slightly less than the inner diameter circumscribed by the array of axial passages 63. The outer diameter of end ring 41, which is the same as the outer diameter of rotor sections 37, is considerably greater than outer diameter 79 of thrust transmitting device 71. The inner diameter 77 of thrust transmitting device 71 is less than the inner diameter of bearing body thrust surface 65. The surface or thrust transmitting area of thrust transmitting device 71 is thus greater than the flat surface area of bearing body thrust surface 65. The thrust transmitting area of thrust transmitting device 71 is less than the surface area of the portion of end ring 41 facing thrust transmitting device 71.

The sum of the axial thickness of the upper and lower thrust transmitting devices 71 is considerably less than the sum of the upper and lower axial gaps 67, 69. The axial thickness of metal portion 73 plus elastomeric portion 75 may each be in the range of 0.060 to 0.090 inch, as an example. The greater sum of axial gaps 67, 69 over the sum of the axial thickness of thrust transmitting devices 71 is selected to allow rotor sections 37 to move axially relative to radial bearings 45 due to thermal growth and contraction.

During operation, initially, each thrust transmitting device 71 may be generally equidistant between end ring 41 and bearing body thrust surface 65. Consequently, during start up, each thrust transmitting device 71 may not be transmitting any thrust. Thrust transmitting devices 71 may or may not be rotating. As motor 17 heats, the overall length of the assembled rotor sections 37 increases relative to the length of stator 27, perhaps as much as ⅛ to ¼ inch. Because radial bearings 45 frictionally grip stator 27 via anti-rotation rings 61, they resist moving axially with shaft 31 and rotor sections 37. Lower gap 69 may become smaller and upper gap 67 larger as the thermal growth occurs.

When lower gap 69 equals the thickness of the lower thrust transmitting device 71, metal portion 73 will be in engagement with bearing body thrust surface 65 and elastomeric portion 75 will be in engagement with end ring 41. The lower thrust transmitting device 71 will transmit thrust from end ring 41 of the next lower rotor section 37 to the lower thrust surface 65 on bearing body 59. Anti-rotation rings 61 resist upward movement of bearing body 59 when thrust is transmitted from a lower rotor section 37. Preferably, the level of thrust being transferred from lower thrust transmitting device 71 to bearing body 59 is not high enough to overcome the frictional engagement of anti-rotation rings 61 with stator 27, thus bearing body 59 does not move axially.

If thrust transmitting device 71 is rotating, sliding engagement between metal portion 73 and bearing body thrust surface 65 occurs while the contact between elastomeric portion 75 and end ring 41 remains static. If thrust transmitting device 71 is not rotating, the reverse occurs. While lower thrust transmitting device 71 is transferring thrust, upper thrust transmitting device 71 will not be transferring any thrust. Gap 67 would be greater than the axial thickness of the upper thrust transmitting device 71.

After thermal equilibrium is reached, shall 31 and rotor sections 37 cease thermally growing relative to stator 27. The cessation in growth causes the thrust imposed on lower thrust transmitting device 71 to drop and even cease. When motor 17 is shut down, it cools, causing shaft 31 and the assembled rotor sections 37 to contract in length relative to stator 27. Lower gap 69 may increase and upper gap 67 shrink in axial dimension. In some circumstances, upper gap 67 may shrink sufficiently to cause thrust to be transmitted through the upper thrust transmitting device 71 when motor 17 is operating.

When either thrust transmitting device 71 is transmitting thrust, the contact of elastomeric portion 75 with one of the end rings 41 will not wear or damage end ring 41 even if the contact is dynamic because of the large surface area of contact and because of the softness of elastomeric portion 75 relative to end rings 41. The entire flat surface area of elastomeric portion 75 will be in contact with one of the end rings 41 while transmitting thrust. The surface area of the interface between metal portion 73 and bearing body thrust surface 65 while transmitting thrust is smaller than the thrust transmitting surface of elastomeric portion 75. The reason is due to the smaller surface area of bearing body thrust surface 65 than end ring 41. The metal portion 73 allows a higher P-V (pressure velocity) contact between thrust transmitting device 71 and bearing body thrust surface 65 than if the entire thrust transmitting device was made from an elastomer. For example, a P-V of 10,000 to 25,000 psi feet per minute may be feasible with thrust transmitting device 71.

While the disclosure has been shown in only one of its forms, it should be apparent to those skilled in the art that various changes may be made.

The invention claimed is:

1. An electrical submersible pump assembly, comprising:
   a pump;
   a motor operatively coupled to the pump for driving the pump, the motor comprising:
   a stator having a bore;
   a shaft extending through the bore along an axis of the motor;
   first and second rotor sections mounted to the shaft for rotation therewith;
   a sleeve mounted to the shaft between the first and second rotor sections for rotation in unison with the shaft;
   a bearing body having a central opening receiving the sleeve and a periphery in non rotating engagement with the bore of the stator, the bearing body having a first thrust surface axially spaced from the first rotor section, defining a first gap, and a second thrust surface axially spaced from the second rotor section, defining a second gap;
   a first thrust washer located in the first gap for transferring thrust between the first rotor section and the first thrust surface of the bearing body when the first gap narrows;
   a second thrust washer located in the second gap for transferring thrust between the second rotor section and the second thrust surface of the bearing body when the second gap narrows;
   each of the first and second thrust washers having a bearing body layer that engages one of the thrust surfaces of the bearing body and a rotor section layer that engages one of the rotor sections while transferring thrust, the bearing body layer and the rotor section layer of each of the first and second thrust washers being directly attached to each other; and
   wherein the bearing body layer of each of the first and second thrust washers is harder than the rotor section layer of each of the first and second thrust washers.

2. The assembly according to claim 1, wherein:
   the bearing body layer of each of the first and second thrust washers comprises a metal or a carbide; and
   the rotor section layer of each of the first and second thrust washers comprises an elastomer.

3. The assembly according to claim 1, wherein:
   a sum of an axial thickness of the first thrust washer plus an axial thickness of the second thrust washer is less than a sum of axial dimensions of the first and second gaps.

4. The assembly according to claim 1, wherein a thrust surface area of a contacting portion of the rotor section layer of the first thrust washer with the first rotor section is greater than a thrust surface area of a contacting portion of the bearing body layer of the first thrust washer and the first thrust surface of the bearing body.

5. The assembly according to claim 1, wherein
   the bearing body layer of the first thrust washer has a smaller inner diameter than an inner diameter of the first thrust surface of the bearing body; and
   the bearing body layer of the second thrust washer has a smaller inner diameter than an inner diameter of the second thrust surface of the bearing body.

6. The assembly according to claim 1, wherein an inner diameter and an outer diameter of the bearing body layer of the first thrust washer are the same as an inner diameter and an outer diameter of the rotor section layer of the first thrust washer.

7. The assembly according to claim 1, wherein:
   an inner diameter of the first thrust washer is greater than an outer diameter of the sleeve.

8. The assembly according to claim 1, wherein:
   the sleeve has a first end in contact with the first rotor section and a second end in contact with the second rotor section; and
   an axial length of the sleeve is greater than an axial distance between the first and second thrust surfaces of the bearing body plus axial thicknesses of the first and second thrust washers.

9. The assembly according to claim 1, wherein:
   the bearing body has a plurality of lubricant flow passages extending axially therethrough, the lubricant flow passages being spaced around the axis in an array at a selected radius from the axis; and
   an outer periphery of each of the thrust washers is located a distance from the axis no greater than the radius of the array of lubricant flow passages.

10. An electrical submersible pump assembly, comprising:
    a pump;
    a motor operatively coupled to the pump for driving the pump, the motor comprising:
    a stator having a bore;
    a shaft extending through the bore along an axis of the motor;
    first and second rotor sections mounted to the shaft for rotation therewith, the first rotor section having a first end ring axially spaced from a second end ring of the second rotor section;
    a sleeve mounted to the shaft for rotation in unison, the sleeve having a first end in contact with the first end ring and a second end in contact with the second end ring, fixing an axial distance between the first end ring and the second end ring;
    a bearing body having a central opening that receives the sleeve and a periphery retained in non rotating engagement with the bore of the stator, the bearing body having a first thrust surface axially spaced from the first end ring, defining a first gap, and a second thrust surface axially spaced from the second end ring, defining a second gap;
    a first thrust washer located in the first gap, the first thrust washer having a metal or carbide layer for contact with the first thrust surface of the bearing body, the first thrust washer having an elastomeric layer for contact with the first end ring, the metal or carbide layer of the first thrust washer being directly attached to the elastomeric layer of the first thrust washer; and
    a second thrust washer located in the second gap, the second thrust washer having a metal or carbide layer for contact with the second thrust surface of the bearing body, the second thrust washer having an elastomeric layer for contact with the second end ring, the metal or carbide layer of the second thrust washer being directly attached to the elastomeric layer of the second thrust washer.

11. The assembly according to claim 10, wherein:
the first and second rotor sections are axially movable relative to the stator and the bearing body in response to thermal growth;
axial movement of the first and second rotor sections in a first direction narrows the first gap to an axial thickness of the first thrust washer and places the elastomeric layer of the first thrust washer in engagement with the first end ring and the metal or carbide layer of the first thrust washer in engagement with the first thrust surface of the bearing body to transfer thrust between the bearing body and the first rotor section; and
axial movement of the first and second rotor sections in the first direction also widens the second gap to a dimension greater than an axial thickness of the second thrust washer.

12. The assembly according to claim 10, wherein:
the fixed axial distance between the first and second end rings is greater than an axial distance from the first thrust surface to the second thrust surface of the bearing body plus axial thicknesses of the first and the second thrust washers.

13. The assembly according to claim 10, wherein:
a surface area of contacting portions of the elastomeric layer of the first thrust washer and the first end ring is greater than a surface area of contacting portions of the metal or carbide layer of the first thrust washer and the first thrust surface of the bearing body.

14. The assembly according to claim 10, wherein the metal or carbide layer and the elastomeric layer of the first thrust washer have inner diameters that are the same and outer diameters that are the same.

15. The assembly according to claim 10, wherein a sum of axial dimensions of the first and second gaps is greater than a sum of an axial thickness of the first thrust washer plus an axial thickness of the second thrust washer.

16. The assembly according to claim 10, wherein:
the metal or carbide layer of the first thrust washer has an inner diameter smaller than an inner diameter of the first thrust surface; and
the metal or carbide layer of the second thrust washer has an inner diameter smaller than an inner diameter of the second thrust surface.

17. An electrical submersible pump assembly, comprising:
a pump;
a motor operatively coupled to the pump for driving the pump, the motor comprising:
a stator having a bore;
a shaft extending through the bore along an axis of the motor;
first and second rotor sections in the bore of the stator and mounted to the shaft for rotation therewith, the first rotor section having a first end ring axially spaced from a second end ring of the second rotor section, the first and second rotor sections being axially movable relative to the stator in response to thermal growth during operation of the motor and during thermal contraction while the motor is shut off;
a sleeve mounted to the shaft for rotation in unison, the sleeve having a first end in contact with the first end ring and a second end in contact with the second end ring, fixing an axial distance between the first end ring and the second end ring;
a bearing body having first and second thrust surfaces and a central opening that receives the sleeve;
an anti-rotation member on an outer diameter of the bearing body in non rotating engagement with the bore of the stator to prevent rotation of the bearing body relative to the stator and retard axial movement of the bearing body relative to the stator;
a first thrust washer located between the first thrust surface of the bearing body and the first end ring and encircling the sleeve, the first thrust washer having a metal or carbide layer that contacts the first thrust surface of the bearing body while transferring thrust, the first thrust washer having an elastomeric layer that contacts the first end ring while transferring thrust, the elastomeric layer of the first thrust washer being directly attached to the metal or carbide layer of the first thrust washer;
a second thrust washer located between the second thrust surface of the bearing body and the second end ring and encircling the sleeve, the second thrust washer having a metal or carbide layer that contacts the second thrust surface of the bearing body while transferring thrust, the second thrust washer having an elastomeric layer that contacts the second end ring while transferring thrust, the elastomeric layer of the second thrust washer being directly attached to the metal or carbide layer of the second thrust washer; wherein
a surface area of an interface between the metal or carbide layer of the first thrust washer and the first thrust surface of the bearing body is less than a surface area of an interface between the elastomeric layer of the first thrust washer and the first end ring; and
a surface area of an interface between the metal or carbide layer of the second thrust washer and the second thrust surface of the bearing body is less than a surface area of an interface between the elastomeric layer of the second thrust washer and the second end ring.

18. The assembly according to claim 17, wherein axial thicknesses of the first and second washer are selected such that:
the thermal growth of the first and second rotor sections causes the first thrust washer to transfer thrust between the first thrust surface of the bearing body and the first end ring while the second thrust washer is free of any thrust transmittal; and
the thermal contraction of the first and second rotor sections causes the second thrust washer to transfer thrust between the second thrust surface of the bearing body and the second end ring while the first thrust washer is free of any thrust transmittal.

19. The assembly according to claim 17, wherein:
the elastomeric layer of the first thrust washer has an inner diameter and an outer diameter that are the same as the metal or carbide layer of the first thrust washer; and
the elastomeric layer of the second thrust washer has an inner diameter and an outer diameter that are the same as the metal or carbide layer of the second thrust washer.

20. The assembly according to claim 17, wherein:
the metal or carbide layer of the first thrust washer has a smaller inner diameter than an inner diameter of the first thrust surface of the bearing body; and
the metal or carbide layer of the second thrust washer has a smaller inner diameter than an inner diameter of the second thrust surface of the bearing body.

* * * * *

UNITED STATES PATENT AND TRADEMARK OFFICE
CERTIFICATE OF CORRECTION

PATENT NO. : 9,941,770 B2
APPLICATION NO. : 14/581095
DATED : April 10, 2018
INVENTOR(S) : Michael R. Rumbaugh and James Christopher Clingman Page 1 of 1

It is certified that error appears in the above-identified patent and that said Letters Patent is hereby corrected as shown below:

Column 1, Line 24, "bearings" should be –bearing–
Column 6, Line 51, "shall" should be –shaft–

Signed and Sealed this
Thirtieth Day of October, 2018

Andrei Iancu
*Director of the United States Patent and Trademark Office*